July 11, 1961  D. CRAVEN  2,991,881
APPARATUS FOR HANDLING SHELL CASINGS AND THE LIKE
Filed Oct. 8, 1956  4 Sheets-Sheet 1

July 11, 1961 D. CRAVEN 2,991,881
APPARATUS FOR HANDLING SHELL CASINGS AND THE LIKE
Filed Oct. 8, 1956 4 Sheets-Sheet 2

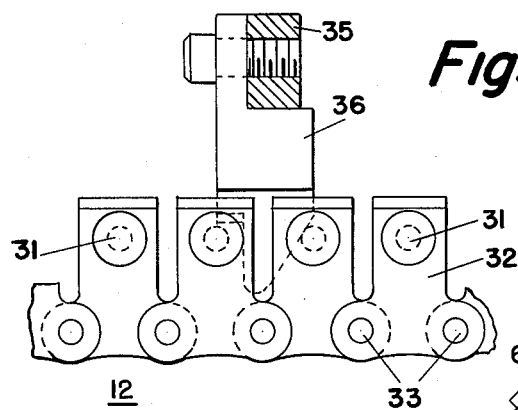
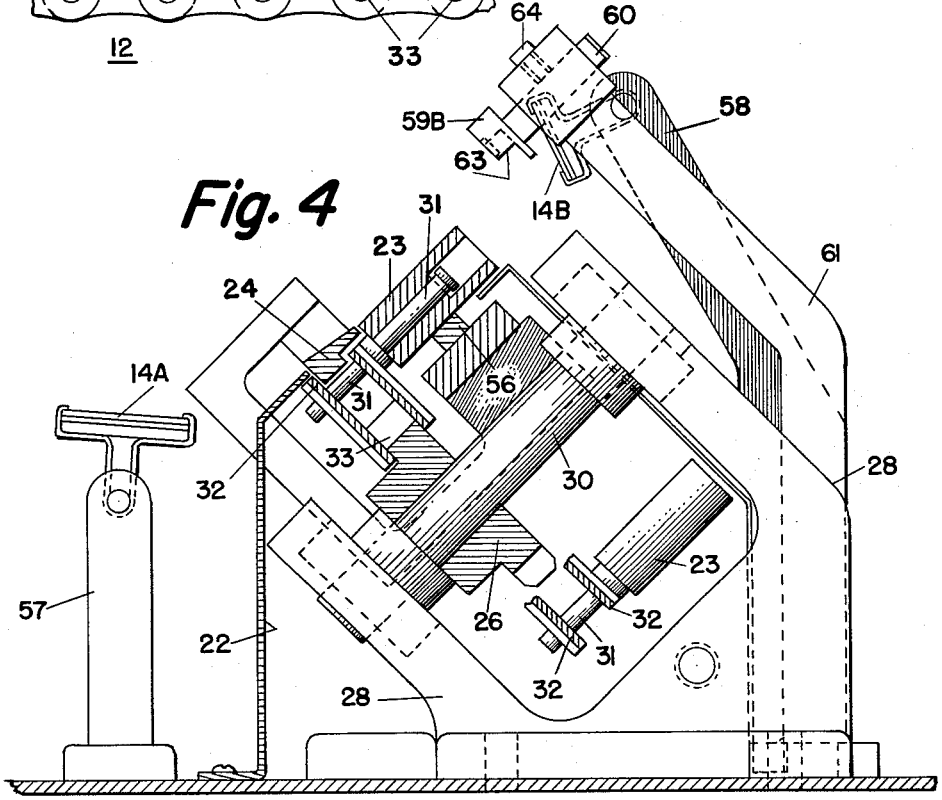
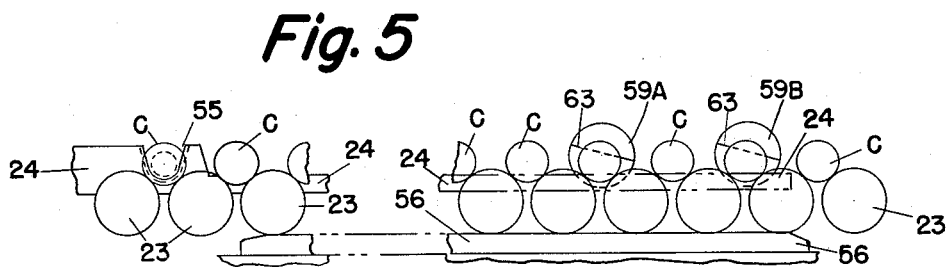

United States Patent Office 2,991,881
Patented July 11, 1961

2,991,881
APPARATUS FOR HANDLING SHELL CASINGS AND THE LIKE
David Craven, Wilmington, Del., assignor, by mesne assignments, to Jennings Machine Corporation, Philadelphia, Pa., a corporation of Pennsylvania
Filed Oct. 8, 1956, Ser. No. 614,645
3 Claims. (Cl. 209—75)

This invention relates to apparatus for handling shell casings and the like for inspection, gaging, annealing and other operations incident to manufacture.

In accordance with one aspect of the invention, the casings are transported, side-by-side in a horizontal direction and with their axes vertically inclined, by a conveyor having open-ended transverse troughs or pockets preferably define by spaced rollers. The lower ends of the troughs are effectively closed by bar structure extending along the lower side of the conveyor there to engage the lower ends of the casings being transported. For loading of the conveyor, the casings may be gravity-fed by one or more tubular guides to a transfer station adjacent the upper side of the conveyor and from there the casings are impelled into individual conveyor troughs by a reciprocating feed-roll which together with associated stop and brake devices is operated in timed relation to the conveyor.

Further in accordance with the invention, the aforesaid bar structure for the lower side of the conveyor is provided with a groove or cut-out which is dimensioned to pass reversely oriented casings so to effect their discharge from the conveyor in advance of the inspection, gaging or other stations along the path of the conveyor.

Further in accordance with the invention, the undersides of the rollers are engaged by a friction member to effect rotation of the casings as they pass through a visual inspection station at which they are retained in the conveyor troughs only by their engagement with the bar structure, so to permit the inspector to flip out of the conevyor any individual defective casing. For examination of the opposite ends of the rotating casings, mirrors are disposed along the upper and lower sides of the conveyor in the inspection zone or station.

Further in accordance with the invention, the conveyor extends through a gaging station in which the casings are automatically released from the conveyor at points respectively corresponding with different casing lengths. More specifically, the gaging and selective discharge of the casings is effected by gage members spaced along the upper side of the conveyor and each having an underface inclined downardly in the direction of movement of the conveyor to engage and depress the upper end of any casing whose length exceeds the gap from that gage member to the aforesaid bar structure; so to tilt that casing out of engagement with the bar structure for gravity-discharge from the conveyor.

The invention further resides in shell-handling apparatus having features of construction, combination and arrangement hereinafter described and claimed.

For a more detailed understanding of the invention, reference is made in the following dscription to the accompanying drawings, in which:

FIG. 3 is a detail view taken in direction indicated by line 3—3 of FIG. 2;

FIG. 4 is a sectional view, on enlarged scale, taken on line 4—4 of FIG. 1;

FIG. 5 is an end elevational view of parts appearing in FIG. 1;

Figure 1:
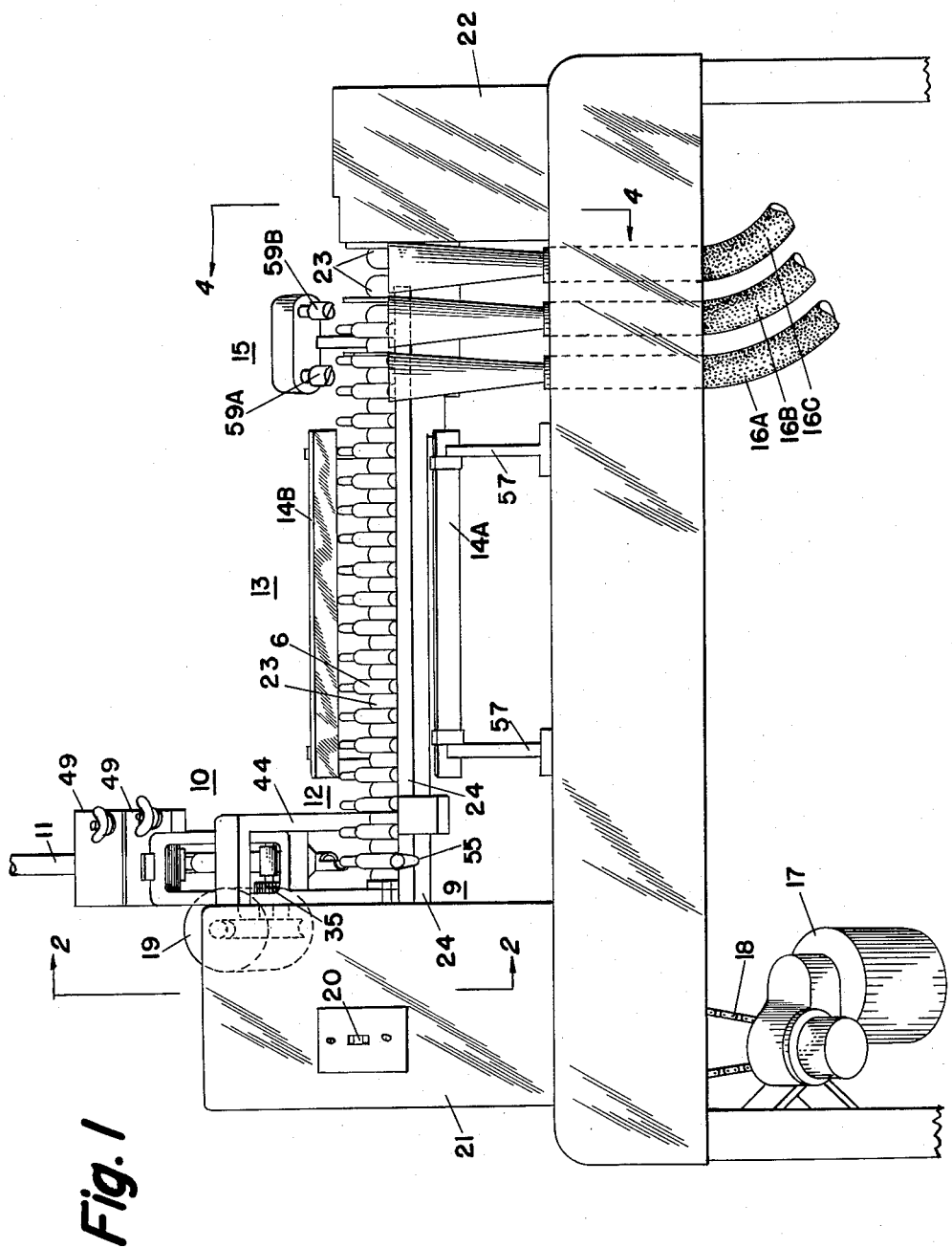
FIG. 1 is a front elevational view of a machine for inspection of shell casings.

Referring to FIG. 1, a stream of shell casings to be inspected is fed by gravity toward the transfer station 10 through guide tube 11 which extends from a prior machine or station. From the transfer station, the shells are in succession positively fed to endless conveyor 12 which transports them through various stations 9, 13, 15 between the housings 21 and 22 at opposite ends of the machine. As transported by conveyor 12, the casings are side-by-side in the gaps between rolls 23. The lower ends of the conveyor pockets or troughs so formed by the rolls 23 are closed by the bar 24 extending along the lower edge of the conveyor through stations 9, 13 and 15.

If any casing as delivered to the first station 9 of conveyor 12 is reversely oriented (see casing C1, FIG. 2A), it is immediately discharged for the conveyor by a suitably shaped notch 55 in the bar 24. The properly oriented casings C remain in the conveyor pockets for transport through the inspection station 13. During travel of the casings through station 13, they are subjected to close scrutiny, and if any casing appears defective, it is removed from the conveyor by the operator. This may be simply effected without disturbing adjacent casings either by tapping the upper end of the defective casing to tilt its lower edge clear of bar 24 or by flipping up the upper end of the defective casing using bar 24 as a fulcrum. By either procedure, defective casings are simply and quickly removed during continued operation of conveyor 12.

The casings remaining on the conveyor 12 after passage through the inspection station 13 are checked at station 15 to determine whether they are normal, abnormal or subnormal length. In accordance with these three categories, the remaining casings are selectively diverted from the conveyor 12 into the corresponding discharge tubes 16A—16C for further processing or disposition depending upon their length classification.

The conveyor 12 for transporting the casings through the inspection and gaging stations may be continuously driven as by motor 17 through a drive chain 18. Operation of motor 19 of the transfer station 10 may be interrupted, as by switch 20, during continued operation of motor 17 to clear conveyor 12 of work.

Figure 2:
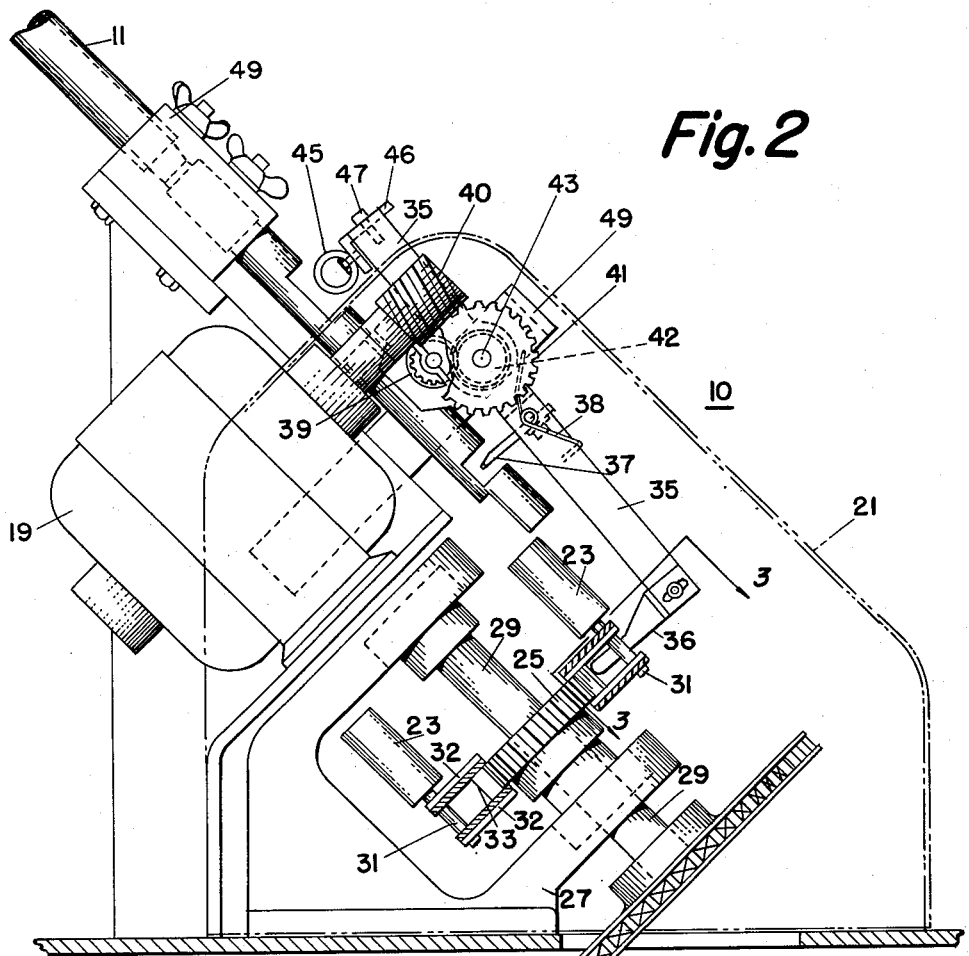
FIG. 2 is a sectional view, on enlarged scale, taken on line 2—2 of FIG. 1.

As shown in FIGS. 2-4, the conveyor 12 is formed by a plurality of pairs of link members 32, 32 joined to each other by the axle 31 of the corresponding roller 23 and joined to adjacent links by pins 33, 33. The opposite ends of the chain 12 are supported (FIGS. 2 and 4) by sprockets 25 and 26 respectively mounted upon shafts 29 and 30 supported in bearing brackets 27, 28 in the housings 21 and 22 (FIG. 1). The conveyor shafts 29, 30 (FIGS. 2 and 4) are inclined upwardly and away from the front of the machine, preferably at an angle of about 45° with corresponding inclination of the axles or stub shafts 31 of the conveyor rolls 23.

The timing of feed of the casings from the transfer station 10 to the conveyor 12 is controlled by the arm 35 (FIGS. 1, 2, 2A and 3) of a frame which is periodically rocked by the conveyor. Specifically, a cam member 36 is adjustably attached to arm 35 for engagement with the axles of the successive conveyor rollers 23. With arm 35 in the position shown in FIGS. 2 and 3, the exit stop 37, carried by arm 35, is in position to hold the lower-most casing of the stream of casings delivered to the transfer station by tube 11. As arm 35 is rocked in counterclockwise direction from the position shown in FIG. 2, the continuously rotating brush or soft rubber roll 39, also carried by frame 35, is brought into engagement with the end casing so that when stop 37 is moved sufficiently to clear the casing, it is immediately positively impelled into the then-aligned conveyor trough defined by an adjacent pair of conveyor rolls 23, 23. The timing of the casing feed may be precisely determined by adjusting cam 36 in direction normal to the path of movement of conveyor 12.

During the aforesaid counterclockwise movement of arm 35 for positive feed of the end casing to the conveyor 12, the entrance stop or brake 45, carried by the upper end of arm 35, is brought into engagement with the next casing of the row so to hold the row of casings stationary until arm 35 is returned, as by biasing spring 38, to its original position shown in FIG. 2.

The feed roll or brush 39 is continuously driven from motor 19 through the gear train comprising worm 40 on the motor shaft, worm wheel 41 and pinion 42 rotatable as a unit about the pivotal axis 43 of arm 35, and the driven pinion of the feed brush. The control arm 35, the feed roll 39, and the stops 37, 45 are pivotally supported for movement as a unit upon the stationary bracket 49. The brake 45, which may be a rubber ring, is mounted upon a bracket 46 adjustably secured as by bolt 47 to the rocker arm 35 or its frame.

Figure 2A:
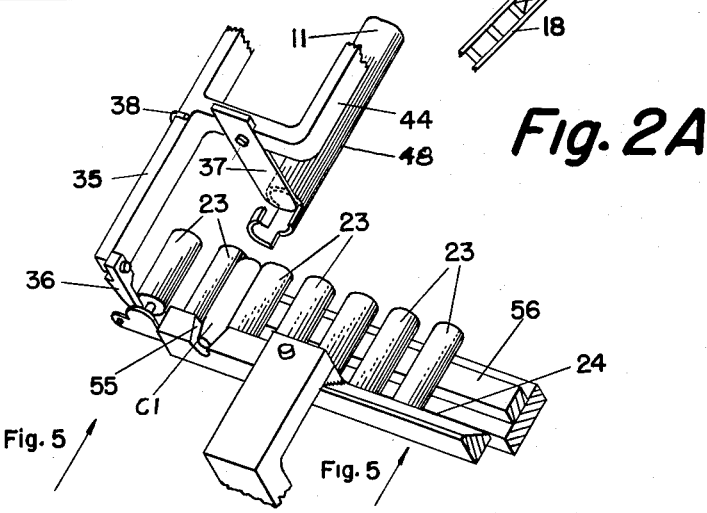
FIG. 2A is a detail view, in perspective, of casing transfer and transporting mechanism shown in FIGS. 1 and 2.

Opposite the discharge end of feed tube extension 48, the bar 24 is of width substantially greater than required to block the gap between the upper faces of adjacent rolls 23 of the conveyor and is there provided with a notch 55. As best shown in FIGS. 2A and 5, the cross-sectional area of the upper or receiving end of the notch is suitably smaller than the large end of the shell casing. Thus, if the casing delivered from the transfer mechanism is properly oriented (large closed end down), it is retained within the conveyor trough by bar 24 and is transported by the conveyor to the inspection station. If, on the contrary, the shell casing is reversely oriented, it passes through the aligned conveyor trough and is deflected upwardly and outwardly of the machine by the narrowing cross-section of the notch or chute 55.

Beyond this rejection station 9, the underfaces of the conveyor rollers 23 are engaged by the elongated friction member 56 (FIGS. 4 and 5) so that during their passage through the inspection station the casings are rotated about their axes repeatedly to bring all portions of their cylindrical surfaces into the direct view of the inspector. Because of such rotation, all portions of the bases of the casings are made visible in lower mirror 14A and the upper open ends of the casings are made visible in upper mirror 14B. The mirrors are adjustably pivoted on their standards 57, 58 to afford the optimum inspection angles. The external surfaces of the rollers 23 are preferably of dark and uniform color to avoid any shifting light pattern which is fatiguing and distracting to the inspector. With such an arrangement, shell casings have been visually inspected for sustained periods and at high speed.

As indicated above in the general description of FIG. 1, the same machine may also be used selectively to discharge the shell casings from conveyor 12 in accordance with their length. For dividing the casings into three length classes, the gaging station 15 may be provided (FIGS. 1, 4, 5 ) with two similar gage heads 59A, 59B carried by studs 60, 60 for adjustment toward and from the bar 24. The gages are locked in their adjusted positions as by clamping bolts 64. As best shown by gage head 59B in FIG. 5, the underside of each of heads 59A, 59B is cut away to provide a cam face 63 which is inclined downwardly in the direction of movement of casings C. The distance from the adjacent faces of bar 24 and the first gage 59A is so adjusted that it will freely pass those casings which are of normal length or less.

If, however, a casing is too long, its upper end will ride under the cam face of gage 59A. The lower end of such casing is thus tilted above the upper edge of bar 24 and the casing slides out of its inclined conveyor trough and into the receiving hopper of the "too-long" discharge tube 16A, FIG. 1.

The second gage 59B is so set that the distance from its lower face to the upper face of bar 24 is suited to pass casings of subnormal length. The upper end of casings which are of normal length are therefore engaged by the forwardly and downwardly inclined cam surface of stop 59B. Thus, such normal casings are tilted upwardly from engagement with the restraining bar 24 and are permitted to slide, by gravity, into the "normal" discharge tube 16B.

As most clearly shown in FIG. 5, the bar 24 within the inspection zone and within the first two gaging zones is much narrower than in zone 9 and may have its upper edge approximately in a plane tangent to the upper faces of conveyor rolls 23. This is sufficient to retain the casings in the conveyor troughs and yet permit them readily to be removed by the inspector and by the gages as above described.

The casings which pass both gages 59A and 59B pass beyond the end of bar 24 and therefore slide out of their troughs into the receiving hopper for the "too-short" tube 16C, FIG. 1.

Figure 6:
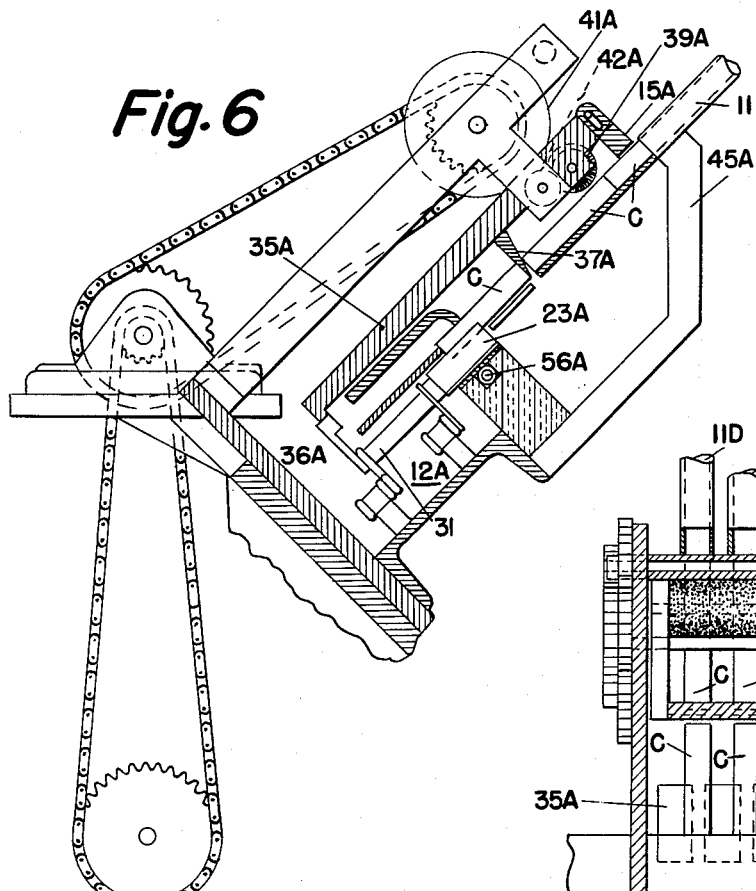
FIGS. 6 and 7 are sectional views in mutually perpendicular planes of an earlier form of the transfer mechanism shown in FIGS. 1 to 5.
Figure 7:
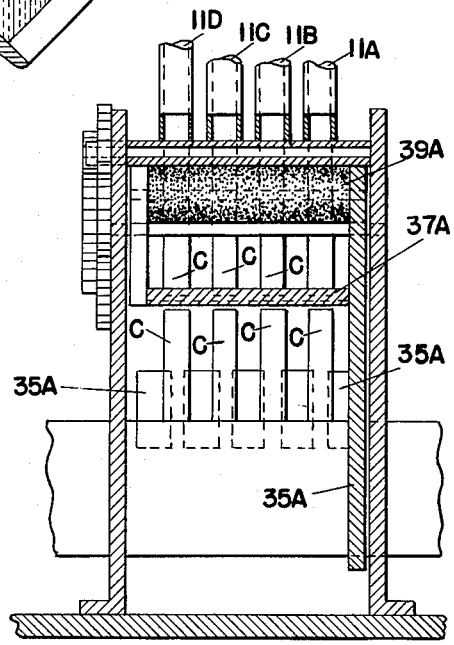
Figure 8:
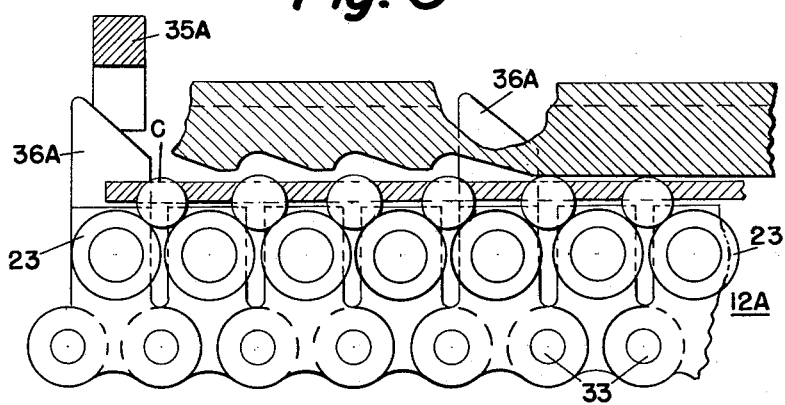
FIG. 8 is a detail view, on enlarged scale, of cooperating elements of the conveying and transfer mechanisms of FIGS. 6 and 7.

An earlier form of my positive transfer mechanism is shown in FIGS. 6 to 8 which respectively correspond with FIGS. 18 to 20 of copending application Serial No. 431,715 upon which has issued Letters Patent 2,823,787. The corresponding elements of the two mechanisms herein disclosed are identified by similar reference characters—with addition in some instances of suffix A in FIGS. 6 to 8.

In the arrangement shown in FIGS. 6 to 8, a plurality of casings are simultaneously impelled from the transfer station to a group of conveyor pockets. As shown in FIG. 7, four streams of casings are gravity fed to the transfer station by the corresponding guide tubes 11A—11D. The end or bottom casings of all streams are restrained by the stop 37A carried by the rocker arm or frame 35A. The cams 36A carried by every fourth link of the conveyor chain periodically rock the arm 35A in clockwise direction from the position shown in FIG. 6. Such movement effects engagement of the continuously driven brush or roll 39A with the end casings so that when the stop 37A completes its retractive movement, the group of four end casings is driven by brush 39A from the transfer station into four aligned conveyor pockets.

During such movement of the end casings of the streams, the next group of end casings is temporarily restrained by engagement with the brake 15A carried by the upper end of arm 35A. As arm 35A returns toward the position shown in FIG. 6, the stop 37A again moves into the paths of the casings; the brake 15A is released to permit the streams of casings to move downwardly to their new position; and brush 39A is moved out of the paths of the casings. The brush 39A is continuously driven in clockwise direction (FIG. 6) by mechanism including gear 41A, 42A and associated chain and sprockets.

The multiple feed-tube and positive-transfer arrangement shown in FIGS. 6 to 8 may be used in the inspection and gaging machine of FIGS. 1 to 5; conversely, the feed-tube and positive-transfer arrangement shown in FIGS. 1 to 5 may be used in casing-annealing machines such as shown in the aforesaid copending application.

What is claimed is:

1. An inspection and gaging machine for shell casings comprising an endless conveyor having a plurality of parallel rollers spaced lengthwise of the conveyor to define troughs extending transversely of the direction of movement of the conveyor, means for supporting said conveyor for travel in a horizontal direction with the axes of said rollers inclined upwardly, stationary bar structure extending along the lower side of said conveyor effectively to close the lower ends of said troughs, feeding means above said conveyor for feeding casings to said troughs thereof, said bar structure having a groove dimensioned to pass any reversely oriented casings but to retain properly oriented casings in their troughs, an inspection station having a friction member engaging the underface of said rollers to effect rotation of the casings being inspected, said bar structure in said station providing continued support for casings not removed from said conveyor troughs by the inspector, and a gaging station including a stationary gage member adjacent the upper side of the conveyor and having an underface downwardly inclined in the direction of movement of the conveyor for engaging the upper end of any casing whose length exceeds the spacing from said gage member to said bar structure and selectively tilting it out of engagement with said bar structure for gravity-discharge from the conveyor.

2. An inspection machine for shell casings comprising an endless conveyor having a plurality of parallel rollers spaced lengthwise of the conveyor to define troughs extending transversely of the direction of movement of the conveyor, means supporting said conveyor for travel in a horizontal direction with the axes of said rollers inclined upwardly, stationary bar structure extending along the lower side of said conveyor effectively to close the lower ends of said troughs, feeding means above the conveyor for feeding casings to said troughs thereof, said bar structure opposite the point of delivery of casings by said feeding means to the troughs having a notch dimensioned to pass any reversely oriented casings, and a friction member engaging the undersurface of said rollers to effect rotation of the casings for inspection, said bar structure providing continued support for casings not removed from the conveyor troughs by the inspector.

3. An arrangement for handling shell casings and the like comprising an endless conveyor having a plurality of parallel rollers spaced lengthwise of the conveyor to define open-ended troughs extending transversely of the direction of movement of the conveyor, means for supporting said conveyor for travel in a horizontal direction with said troughs facing upwardly with the two ends of each trough being at different heights, stationary bar structure extending along the lower side of said conveyor effectively to close the lower ends of said troughs, said bar structure having a notch extending across it away from the path of movement of the lower ends of said conveyor troughs and dimensioned to pass a reversely oriented casing for gravity-discharge from the conveyor, said notch being in alignment with the path of feed of the casings by said feed-roll into successively aligned troughs of the conveyor, structure for guiding a stream of said casings in end-to-end relation and having its delivery end adjacent the upper side of said conveyor, a reciprocable stop between said delivery end of the guiding structure and said conveyor, a reciprocable feed-roll disposed in advance of said stop by less than a casing length, means for rotating said feed-roll, a reciprocable brake member disposed in advance of said stop by more than one casing length and less than two casing lengths, and means operating in timed relation to said conveyor to effect reciprocation of said stop, said feed-roll and said brake member for positive feed of casings individually from said guiding structure into the upper ends of individual troughs of said conveyor for transport of the casings in side-by-side relation with their lower ends in supporting engagement with said bar structure, said brake member when moved in one direction permitting advance of the stream of casings to bring the end casing of the stream as arrested by said stop into the path of reciprocation of said feed-roll and when moved in reverse direction precluding advance of the remaining casings of the stream when said stop is moved to position permitting said end casing to be positively fed by said feed-roll into a trough of said conveyor.

References Cited in the file of this patent

UNITED STATES PATENTS

| | | |
|---|---|---|
| 632,986 | Brooks | Sept. 12, 1899 |
| 1,275,581 | Macomber | Aug. 13, 1918 |
| 2,296,645 | Marsden | Sept. 22, 1942 |
| 2,329,873 | Busby | Sept. 21, 1943 |
| 2,356,203 | Birdsall | Aug. 22, 1944 |
| 2,677,304 | Wallingford | May 4, 1954 |
| 2,823,787 | Morgan | Feb. 18, 1958 |

FOREIGN PATENTS

| | | |
|---|---|---|
| 458,356 | Germany | Apr. 4, 1928 |
| 812,888 | France | Feb. 15, 1937 |